Aug. 13, 1946.  R. L. LORENZ  2,405,841
PROGRAM INSTRUMENT
Filed Dec. 14, 1942  3 Sheets-Sheet 1

Inventor
Richard L. Lorenz

Aug. 13, 1946.  R. L. LORENZ  2,405,841
PROGRAM INSTRUMENT
Filed Dec. 14, 1942  3 Sheets-Sheet 2

Inventor
Richard L. Lorenz

Patented Aug. 13, 1946

2,405,841

UNITED STATES PATENT OFFICE 2,405,841

PROGRAM INSTRUMENT

Richard L. Lorenz, Chicago, Ill., assignor to General Time Instruments Corporation, New York, N. Y., a corporation of Delaware Application December 14, 1942, Serial No. 468,924

32 Claims. (Cl. 161—3)

This invention relates to improvements in program instruments, and more particularly to an improved program instrument, the operation of which is controlled by a punched circular chart.

The program instrument is a device for closing an electrical circuit at a predetermined time. A program instrument is usually a part of a time system and incorporates a secondary mechanism which actuates the program instrument in accordance with the controlled electrical impulses of the time system.

The operation of the program instruments of the prior art has usually been controlled by a punched tape or settable lugs disposed on a drum or disk. The removal and substitution of another punched tape, or the accurate setting of adjustable lugs is not effected without difficulty by those who are required to change schedules.

Also, in the prior art a variable minute schedule could be had only through employment of large disks or drums, or a long tape, while in the present invention a comparatively small chart is used, which can be controlled and marked in such a manner that any minute of the twenty four hours may be utilized to close the signal circuit, including consecutive minutes. The time schedule on the chart is imposed in a permanent manner so that difficulty due to slippage or loosening of settable lugs or the stretching or shrinkage, as the case may be, of long tapes is avoided. In the tape type of instrument, the tape, being flexible, is difficult to handle when it is removed and is difficult to punch.

In the present invention, of which the program instrument herein disclosed and described is a preferred embodiment, the circular chart is of fiber board, cardboard or some other rigid or semi-rigid material, having a thickness of approximately .020 in. The program instrument is constructed to permit of easy removal and replacement of the chart. When removed, the chart is easy to handle, being rigid and of a convenient size. Preferably the chart is marked off by a combination of radial and spiral lines, the intersections of the two lines forming proximate locations for punching in selecting a time schedule, the punching being done on the radial lines, but either directly below or above the spiral line, depending on whether a. m. or p. m. time is wanted.

The minutes can be marked on the chart at the terminus of the radial lines near the periphery of the chart and the intersections of the spiral line with the radial line designating "0" minutes denote the termini of succeeding hours, and can be so marked on the chart. The 60 radial lines are angularly disposed on the chart in a clockwise direction so that the analogy to corresponding minute marks on a clock dial is apparent. The spiral line makes 12 convolutions and the chart is adapted for two cycles of operation in 24 hours. However, as an alternative construction the chart and the program cam which controls the chart feeler or the sensing device, can also be constructed for one cycle of operation in 24 hours, the chart in this instance being provided with one spiral line which makes 24 convolutions. This, however, would increase the chart size for corresponding clarity in reading and punching.

A further object is to provide in a program instrument a chart or visual record of the desired schedule covering a time period, said record being permanently recorded in such a form that same may be filed for later use if desired, without disturbing the inscribed record or affecting its accuracy.

A further object is to provide in a program device, in combination with a punched chart or record of the desired signal controlling schedule, a cam that will control certain fields or areas representing time periods on the chart with a view toward producing a chart that is comparatively small and that is easy to handle, punch and file.

A further object is to provide in a program machine, a means to permanently record a signal controlling schedule so that the operable positions in time as represented by the said schedule are not dependent upon loose pieces that are set to the time schedule, nor subjected to a variation through possible shrinkage or stretching, as the case may be, of a tape that is punched to the schedule, but are recorded on a material that is fairly indestructible and non-inflammable and will maintain the accuracy of the punched schedule for future use after once recording same.

A further object is to provide in a program instrument an enclosed switch for closing the program circuit, the operation of which is controlled by a feeler rather than by the provision of exposed contact points which close the program circuit. Thus there are no contact points which are exposed to the corrosive vapors which are often present in industrial plants where the program instrument is often located. Furthermore, it results in more positive operation.

A still further object is to provide an improved secondary mechanism operable upon the receipt of each impulse for rotating a shaft a fraction of a revolution and for displacing said shaft in an axial direction.

Other objects, advantages and features of my invention will become apparent as this description proceeds.

With reference now to the attached drawings which form a part of this specification, and in which like reference numerals refer to like parts.

Figures 3, 7, 8, 9, 10:
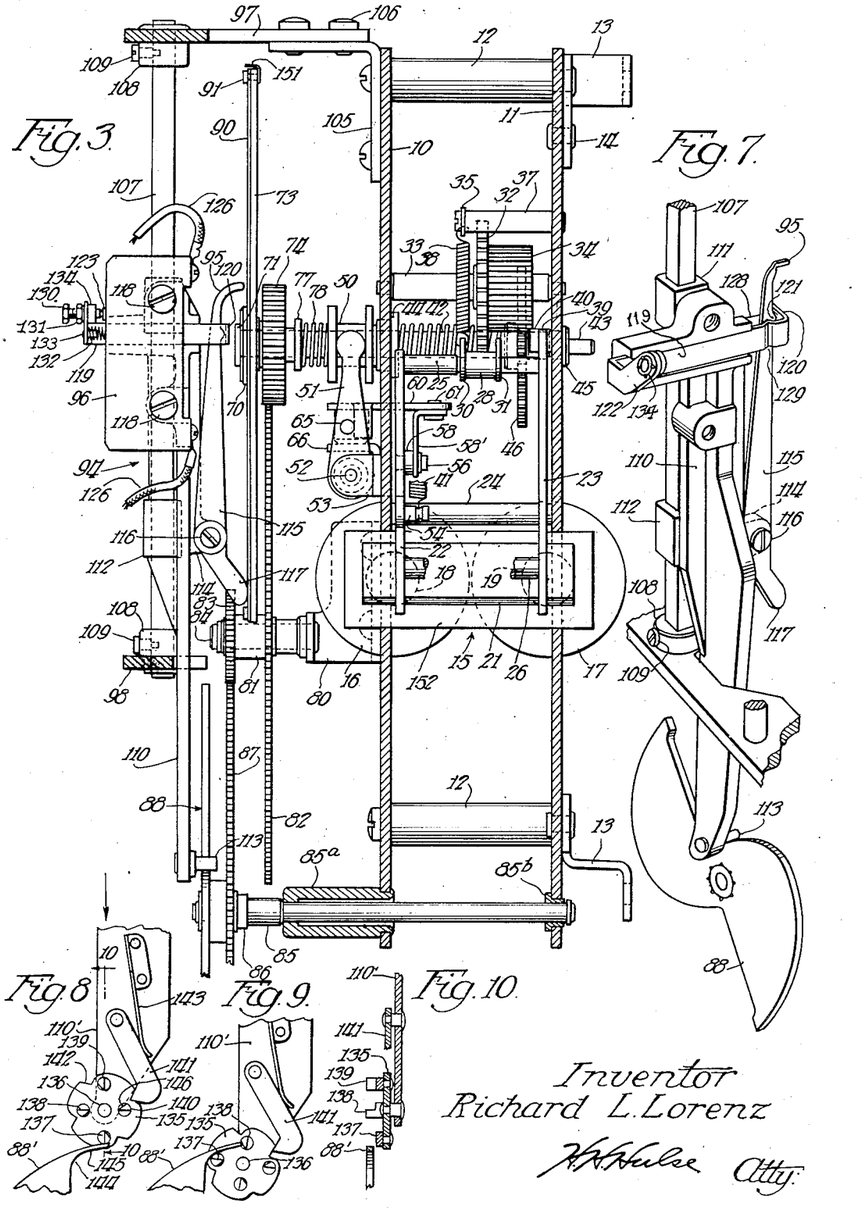
Fig. 3 is a sectional elevation taken along line 3—3 of Fig. 1.
Fig. 7 is a perspective view of the switch assembly, the micro switch being removed for purposes of clarity.
Fig. 8 is a detailed view of a modification of the lower portion of the switch assembly.
Fig. 9 is a view similar to Fig. 8, but showing the parts in a changed position.
Fig. 10 is a section taken along line 10—10 of Fig. 8.

With reference now to Fig 3, the structure of the program instrument comprises a front plate 10 and a rear plate 11, the plates being spaced from each other by a plurality of pillars 12. Brackets 13 are provided for mounting the program instrument on a panel, the brackets being secured to the rear surface of the rear plate 11 by rivets 14 and by the heading over of the reduced portions of the pillars 12.

The program instrument is actuated by an electromagnet, designated generally by the reference numeral 15. The electromagnet comprises coils 16 and 17 which are mounted in cutaway portions of the front and rear plates, respectively, by means of the usual yoke plate 152 and by a flux-carrying base piece 20. The coils are provided with cores 18 and 19, the right ends of which, as viewed in Fig. 1, form the pole pieces of the electromagnet, and a flux-carrying armature piece 21 is provided for cooperation with the pole pieces.

Armature levers 22 and 23 are pivotally mounted between the front and rear plates by an arbor 24, each lever being positioned adjacent to the interior surface of one of the plates and being held in spaced relationship by means of upper and lower spacer members 25 and 26. The arbor 24, on which rigid armature assembly is mounted, is received in the front and rear plates so as to permit pivotal movement of the assembly during energization and deenergization of the electromagnet 15.

The armature piece 21 is received in cutaway portions in the lower parts of the armature levers 22 and 23, and is held in position by means of rivets 27 which extend through the armature piece 21 and the lower spacer member 26. A sleeve 28 is pivotally mounted on the upper spacer member 25 but suitably secured against axial displacement, and to this sleeve are secured at either end thereof parallel pawl arms 30 and 31. A pawl pin 29 (Figs. 1 and 2) extends between the pawl arms 30 and 31 at their outer ends. The pawl pin 29 cooperates with a thirty tooth ratchet wheel 32 which is disposed above the armature assembly and which is suitably secured to an arbor 33, pivotally mounted in the front and rear plates. A gear wheel 34, of considerable width, is associated with the ratchet wheel.

A locking pawl 35, carrying a pawl pin 36 (Figs. 1 and 2), is pivotally mounted on a post 37 extending forwardly from the rear plate 11. A spring 38 extends between the locking pawl 35 and the pawl arm 30 so as to bias both of the pawl pins 29 and 36 into engagement with the ratchet wheel 32.

Figures 1, 6:
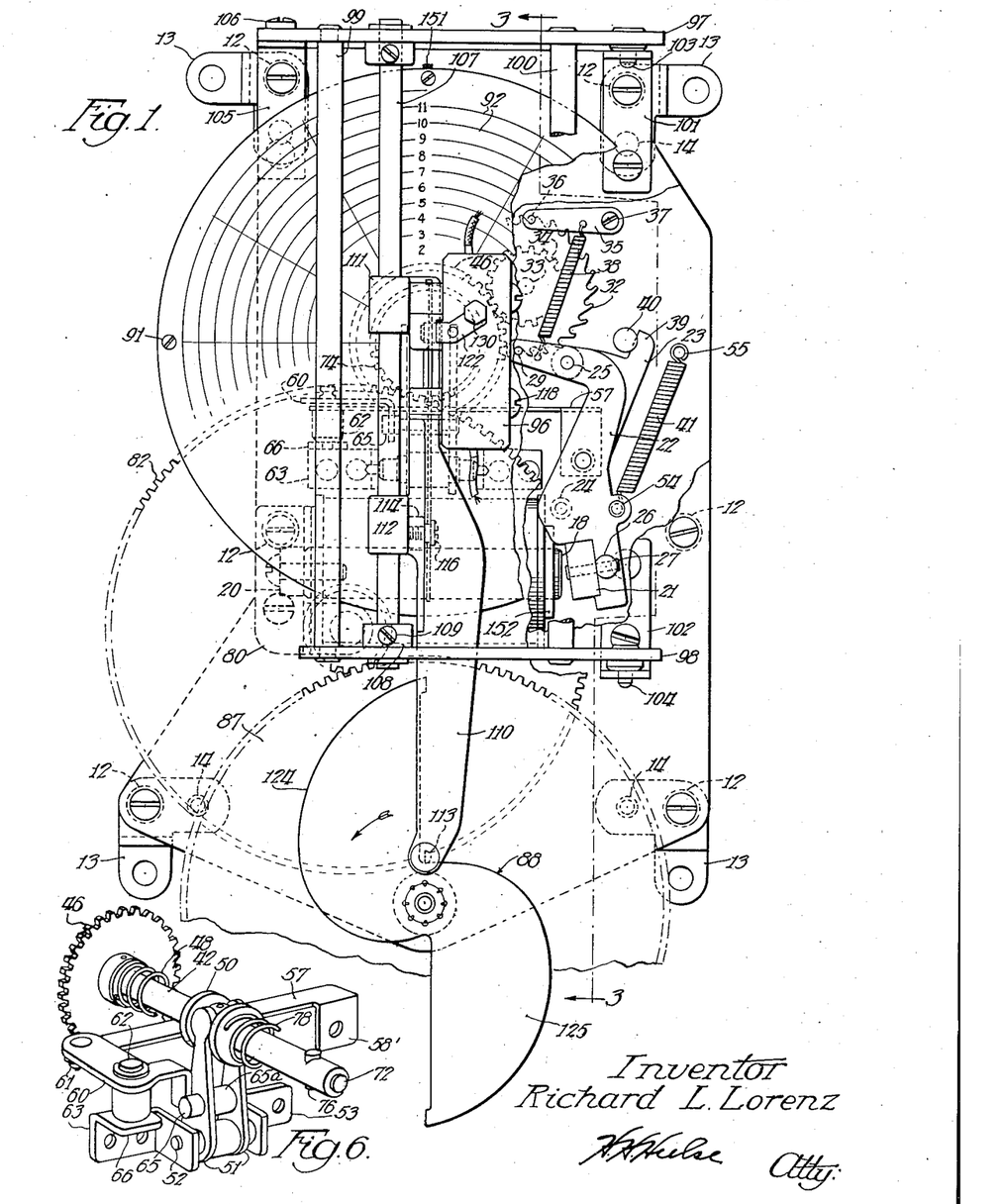
Fig. 1 is a front elevation of a preferred embodiment of this invention, certain parts being broken away to show more clearly the underlying mechanism.
Fig. 6 is a perspective view of the means for displacing the hour shaft.

A projection 39, formed on the armature lever 23, is adapted to engage a stop pin 40 extending forwardly from the rear plate so as to limit the motion of the armature assembly into its unattracted position. An operating spring 41 is tensioned between a pin 54 on the front armature lever 22 and a pin 55 on the front plate 10, as shown in Figs. 1 and 3. The operating spring 41 biases the armature assembly into unattracted position, as determined by the stop pin 40.

In operation it will be seen that each time the electromagnet 15 is energized, the armature assembly will be rotated in the clockwise position, as viewed in Fig. 1, against the biasing of the operating spring 41, thereby retracting the pawl pin 29 over one tooth of the ratchet 32. The locking pawl 35 prevents any counterclockwise rotation of the ratchet wheel at this time. When the electromagnet is de-energized, the operating spring 41 causes the armature assembly to be rocked in the counterclockwise direction, thereby rotating the ratchet wheel in the clockwise direction. The stop 40 is positioned so that the advance of the ratchet wheel will be to the extent of one tooth only. It will thus be seen that if the electromagnet is energized by impulses which occur every minute, the ratchet wheel 32 and the gear 34 will make two revolutions per hour.

Figures 2, 4, 5:
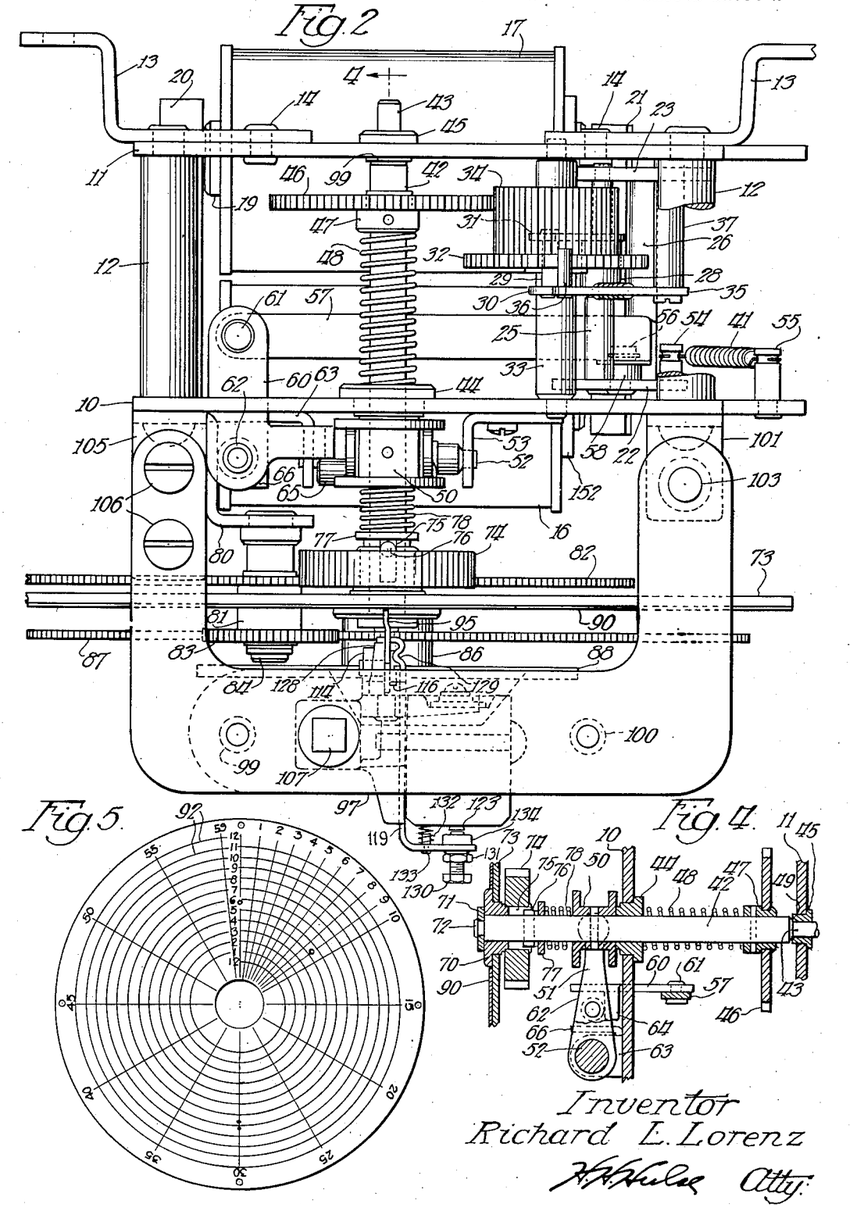
Fig. 2 is an enlarged plan view of the device shown in Fig. 1.
Fig. 4 is a section of the hour shaft taken along line 4—4 of Fig. 2.
Fig. 5 is an elevation, on a reduced scale, of the chart.

An axially displaceable hour shaft 42 is rotatably mounted in the front and rear plates. The rear end 43 of the hour shaft is of reduced diameter and is journaled in a bearing 45 provided in the rear plate 11, as shown in Figs. 2, 3 and 4. The front portion of the hour shaft is extended forwardly of the front plate 10, and the hour shaft is journaled at an intermediate portion in the bearing 44 provided in the front plate. A gear 46 is carried on the hour shaft 42 and meshes with the gear 34 so that the hour shaft may be driven therefrom at a rate of one revolution per hour. The gear 46 is staked to a hub 47, the hub being pinned to the hour shaft 42.

A helical spring 48 surrounds the hour shaft 42 and is confined between the front bearing 44 and the hub 47, thereby urging the hour shaft 42 rearwardly. The extreme rearward position of the hour shaft 42 is determined by the abutment of the shoulder 49 against the rear bearing 45 (Fig. 4).

A flanged collar 50 is pinned to the hour shaft 42 and the flanges thereof are engaged by the upper rounded ends of the two arms of a yoke 51. The yoke is pivotally mounted by an arbor 52 which is journalled in brackets 53 and 53, the brackets being secured to and extending forwardly from the front surface of the front plate 10.

Means are provided to rock the yoke and to displace the hour shaft 42 forwardly against the compression of spring 48 during energization of the electromagnet 15. This means comprises a link 57 which extends between a rearwardly projecting pin 58 on the armature lever 22 and the rear end of a bell crank 60, which extends through the front plate. The right hand end of the link 57, as viewed in Figs. 1 and 2, is turned down as indicated at 58' and is apertured to receive the reduced end 56 of the pin 58. The bell crank 60 is mounted on a pivot 62 which extends upwardly from the bracket 63, and is associated with the link 57 by means of a pin 61. The bracket 63 is provided at one portion of its upper edge with a turned down forwardly extending portion 66 which supports the pivot 62. The pivot itself is a cylindrical member of considerable diameter which is rigidly secured to the portion 66 so as to form a stable fulcrum for the bell crank 60. The forward right hand end of the bell crank 60, as viewed in Figs. 1, 2 and 6, is bent downwardly and engages the side of a pin 65 which extends outwardly from one of the arms of the yoke 51. Pin 65 passes through both arms of the yoke 51 and is headed over with a collar 65a imposed between the yoke arms. This construction maintains the two arms of the yoke in alignment.

In operation it will be seen that as the armature assembly is rotated the bell crank 60 will be rocked in the clockwise direction, as shown in Fig. 2, thereby rocking the yoke 51 forwardly and axially displacing the hour shaft 42.

A hub 70 is slidingly mounted at the end of the hour shaft 42. A washer 71 is mounted on a reduced end portion 72 of the hour shaft and is confined in position between the headed over end of the reduced portion 72 and shoulder formed by the main portion of the shaft. The washer 71 prevents the hub 70 from sliding off the front end of the hour shaft. A disk 73 is staked to the hub 70, as shown in Fig. 4, the disk serving as a backing for the removable chart 90. A gear 74, of considerable width, is also staked to the hub 70 at a rearwardly extending portion thereof. The hub 70 is provided with a slot 75 at its rearwardly extending portion, and a pin 76 extends through the shaft 42 and engages the wall of the slotted portion of the hub. In this manner the hub is carried on the shaft so that the disk 73 and the gear 74 will rotate therewith but axial movement of the hub assembly is permitted.

A washer 77 is positioned on the hour shaft 42 adjacent to the rear edge of the hub 70, and a spring 78 is confined between the washer 77 and the flanged collar 50 to urge the hub assembly forwardly to the limit of its motion, as determined by the washer 71.

In operation it will be seen that the disk 73, its associated chart 90, and the gear 74 will be rotated at one revolution per hour in increments of one-sixtieth of a revolution upon the receipt of each minute impulse. As the hour shaft 42 is displaced forwardly each minute, the hub assembly, being urged against the washer 71 by the spring 78, will also tend to move forwardly with the hour shaft. However, if the forward displacement of the hub assembly is blocked, by means hereinafter described, the spring 78 will take up the difference in motion between the hour shaft and the hub assembly, and the hour shaft will still be permitted the free extent of its motion.

A Z-bracket 80, as shown in Figs. 1 and 3, is secured to the front surface of the front plate 10. A post or stub shaft 84 is secured to the front portion of the Z-bracket 80, and a sleeve 81 is rotatably mounted on the stub shaft. A gear 82 is mounted at an intermediate portion of the hub 81, the gear 82 meshing with the gear 74. A pinion 83 is secured to the forward portion of the hub 81, and meshes with a gear 87. Journals 85a and 85b are provided in the front and rear plates, respectively, for a shaft 85, to the extended forward portion of which is secured a hub 86. The gear 87 and a cam 88 are carried on the hub 86. The gearing just described is so proportioned that the cam 88 will be driven from the gear 74 at the rate of one revolution every twenty-four hours. The gear 74 is of such a width that it is always enmeshed with the gear 82, even though the former gear is displaced with the hour shaft 42. Similarly the gear 34 associated with the ratchet 32 is of such a width that it is always enmeshed with the gear 46, even though the latter is axially displaced every minute.

The chart 90 is preferably made of fiber-board or of other material of an appreciable thickness, and is removably affixed to the disk 73 by means of screws 91. The center of the circular chart is provided with an aperture to accommodate a portion of the hub 70. As shown in Fig. 5, the chart is provided with a spiral line 92 which starts at a point near the center and makes twelve complete convolutions as it approaches the periphery of the disk of the chart. The chart is also provided with sixty radial lines which intersect the spiral line. Each radial line represents a minute of time, and they are marked off by the numerals 0 to 59, as shown in the drawings. Where the spiral crosses the "0" line, the hours are marked off by the numerals 12, 1, 2, etc., up to 12. The minutes are marked off in a clockwise direction just as in a clock dial, which facilitates punching, and the hours increase from the center of the chart outward.

A pointer 151 is secured to disk 73 to facilitate the affixing of the chart 90, the chart being positioned so that the "0" line is opposite the pointer.

A switch assembly, designated generally by the reference numeral 94, is slidingly mounted at the front of the program instrument, this assembly including a feeler 95 which cooperates with the face of the chart 90 and with a microswitch 96 which is operated by the feeler to open and close the program circuit. The switch assembly is mounted on a swinging frame which comprises an upper U-shaped frame member 97 and a lower frame member 98 which are associated with each other by vertically disposed spacer members 99 and 100. The frame is supported by upper and lower brackets 101 and 102 which are screwed to the front plate 10. Pivots 103 and 104 are carried at the right hand inner end of the upper and lower frame members 97 and 98, as shown in Figs. 1 and 2, these pivots fitting into suitable apertures formed in the upper and lower brackets 101 and 102. The pivots permit the frame to be swung from its normal position as shown in Fig. 2, away from the program instrument to permit removal or replacement of the chart 90.

A bracket 105 is secured to the front surface of the front plate 10 at a point opposite the left hand end of the upper U-shaped frame member. The latter is provided with screws 106 which are adapted to be screwed into the bracket 105 to maintain the swinging frame in its closed operative position. When the chart is to be replaced, the screws 106 are loosened and removed; the frame can then be swung to its open position.

A guide member 107 of square cross-section extends between the upper and lower frame members and is secured to each by means of collars 108, staked to the respective frame members, and dog point screws 109, the guide member being drilled to receive the dog points, as shown in Fig. 3. The switch assembly 94 includes a body member 110 which is provided with lugs 111 and 112, the lugs having aligned apertures of square cross-section which are adapted to fit around the guide member 107 to permit vertical sliding motion of the switch assembly. The microswitch 96 may be suitably secured to the body member 110, as by screws 118. The lower portion of the body member 110 extends into juxtaposition with the cam 88 and is provided with an inwardly projecting slabbed pin 113 which rides on the cam 88. It will thus be seen that the angular position of the cam 88 determines the vertical position of the switch assembly 94.

A lug 114 extends from the rear side of the body member 110, as shown in Figs. 2, 3 and 7, and a lever 115 is pivotally mounted on said lug by means of a shoulder screw 116. The upper end of the lever 115 comprises the feeler 95, and the lower end comprises a rounded rearwardly extending portion 117 which is adapted to contact the surface of the chart 90.

The upper end of lever 115 is guided by being interposed between the side surface of a stop lug 128 and an inwardly bent portion 129 of a sliding member 119, described hereinafter. Thus sidewise motion of lever 115 is limited and controlled and the feeler 95 is closely oriented to the chart hole locations, while permitting sufficient freedom of pivotal motion to lever 115.

It will be seen that the distance from the lower chart contacting portion 117 of the lever 115 to its fulcrum, the screw 116, is very much less than the distance from the fulcrum to the feeler. Therefore, a comparatively small displacement by the chart 90 of the portion 117 will cause a relatively large movement of the feeler 95 in the opposite direction.

Forward displacement of the hour shaft 42 and of the chart 90, when the electromagnet 15 is energized, will cause operation of the feeler. That is, the feeler 95 will be displaced rearwardly into contact with the surface of the chart; or, if a perforated portion of the chart is opposite the feeler, it will be displaced to a greater extent into contact with the surface of the disk 73. The feeler will remain in its displaced position until the electromagnet is de-energized. The chart is not rotated by the energization of the magnet but by the operating spring 41 upon de-energization. The parts are so proportioned that the feeler will clear the perforated portion of the chart before the latter is rotated. For instance, as shown in Fig. 1, the teeth of the ratchet wheel 32 are provided with a relatively long overhang which permits, during de-energization, an armature movement of sufficient extent before the next tooth is engaged as to cause retraction of the feeler from the chart.

A sliding member 119 links the feeler 95 with the micro-switch 96. The sliding member extends through a slotted portion of the body member 110 and along the side of the micro-switch 96. The rearward end of the sliding member 119 is bent over to one side as indicated at 120 and is engaged by a rounded projection 121 formed on the rear edge of the lever 115 near the feeler end thereof.

The forward end of the sliding member 119 is bent over as indicated at 122 and engages the plunger 123 of the micro-switch 96 by means of an adjusting screw 130, as shown in Figs. 2 and 3. This adjusting screw is threaded through a bushing 134 provided in the forward bent over portion 122 of the sliding member 119 and is maintained in proper adjustment by means of a jam nut 131 which bears against the bushing. Thus any discrepancy in the uniformity of the parts and in the operation of the micro-switches, when the devices are assembled, can be compensated. A pin 133 is secured to the bent over portion 122 of the sliding member 119 and serves to maintain a spring 132 in a position wherein it is confined between the sliding member and the surface of the micro-switch 96. The spring biases the sliding member 119 into its normal position, as determined by the abutting of the rearward bent over portion 120 against the end of the stop lug 128.

The micro-switch 96 may be connected into the program circuit by means of the conductors 126. These conductors may be coiled, or may otherwise be looped so as not to interfere with the free sliding movement of the switch assembly 94.

The characteristics of the micro-switch are such that a circuit through the micro-switch may be opened and closed by a very slight movement of its plunger. The micro-switch 96, herein shown, is operated by the movement of the feeler through a distance corresponding to the thickness of the chart 90. The bias on the sliding member 119 is sufficient to maintain the feeler normally clear of the surface of the chart, and the screw 130 is so adjusted that movement of the sliding member to an extent sufficient to take up this clearance will not close the circuit through the micro-switch. However, when the feeler 95 is opposite a perforated portion of the chart 90, the additional movement of the feeler as it drops into the perforation will be sufficient to operate the micro-switch to close the program circuit.

The cam 88 is provided with two lobes, an a. m. lobe 124 and a p. m. lobe 125. The cam surfaces of both the a. m. and p. m. lobes are spirals, but the points on the a. m. lobe which correspond to similar points on the p. m. lobe are displaced toward the center of the cam by a distance equal to approximately one-half of the distance between the adjacent convolutions of the spiral line 92 of the chart 90. Thus at 6 a. m. the position of the switch assembly 94 will be somewhat below its position at 6 p. m., and the position of the feeler 95 along the "0" line will be just below the intersection of that line with the sixth convolution of the spiral line 92; whereas, at 6 p. m. the position of the feeler will be slightly above this intersection.

As the cam 88 rotates through 360° in twenty-four hours, during the first twelve hours the switch assembly 94 will be caused to be moved upwardly through a distance equal to the distance along the zero line of the chart from 12 to 12. At 12 noon, the slabbed pin 113 will drop off the a. m. lobe 124 and the switch assembly will be returned to its starting position. During the next twelve hours the switch assembly will then be moved upwardly through a corresponding distance. During the upward movement of the switch assembly in each twelve hours the chart makes twelve complete revolutions. It will therefore be seen that the feeler 95 traces a spiral path with respect to the surface of the chart 90. During the morning this spiral path will be displaced below the spiral line 92, and during the afternoon this spiral path will be displaced above the spiral line. This is due to the radial offsetting of the two lobes of the cam 88 one from the other.

The chart 90, as shown in Fig. 5, is provided with a plurality of perforations representing the times at which the program circuit is to be closed. For instance, a perforation appears near the intersection of the sixth convolution of the spiral line 92 with the "0" line. The fact that the perforation is below the line indicates that the program circuit will be closed at six o'clock a. m. As indicated above, at six p. m. the feeler above the line will not register with the a. m. perforation.

Similarly the chart is punched for operation at 4:09 p. m. The angular arrangement of the minute positions on the chart in a manner analogous to the minute positions on the ordinary clock dial facilitates the punching and the reading of the chart. By perforating the chart both above and below the spiral line, at a given intersection, the program circuit will be closed both in the morning and afternoon. In Fig. 5, the chart is punched for operation at 7:30 a. m. and 7:30 p. m.

The operation of the feeler 95 can be termed sensing, and the sensing means could be said to cooperate with a certain field of the chart 90. As pointed out above, the chart 90 is provided with two spiral fields which are alternately sensed during alternate twelve hour periods. Each field carries a plurality or a series of selectable positions, any of which can be made operable by punching the chart. These positions signify certain predetermined times. Of course, if it is desired, the chart may be provided with a single field which would be sensed in a twenty-four hour cycle of operation. In this instance, of course, the cam 88 would be provided with only a single lobe and the chart 90 would be provided with a spiral making twenty-four convolutions, the spiral line in this instance designating the center of the twenty-four hour field of operation. In the preferred arrangement herein shown and described, however, the spiral line 92 represents the outer or peripheral boundary of the a. m. field of the chart and the inner or central boundary of the p. m. field. By serving this double function, the distance between successive convolutions of the spiral line is greater, thereby facilitating the reading and punching of the chart. Furthermore, only one set of hour indicia along the "0" line, and only one set of minute indicia around the periphery of the chart, are necessary, the same sets serving for both a. m. and p. m. operation.

The operation of the various parts of the program instrument have been described above. It will be seen that upon receipt of an impulse the chart 90 will be displaced forwardly against the rounded lower end 117 of the lever 115. The extent of this forward displacement is determined by the amount of free movement permitted the feeler 95. If the feeler 95 is not opposite a perforation in the chart, the sliding member 119 will not be displaced sufficiently to close the circuit through the micro-switch 96. At those times, however, when the feeler is opposite a perforation in the chart, the sliding member will be displaced sufficiently to operate the micro-switch and the circuit will be closed for the duration of the minute impulse which actuates the electromagnet 15 which is approximately one second. When it is desired to have a signal of longer duration, the micro-switch can be made to close a circuit to a time delay relay, or what is commonly known as a thermal relay. These time delay devices in turn have contacts that can be adjusted to open the signal circuit after the lapse of a predetermined period of time.

As the electromagnet is de-energized, the chart 90 and the hour shaft 42 return to their normal position by the action of the spring 43, thereby relaxing the pressure on the plunger 123 of the micro-switch and opening the circuit through the program instrument. At substantially the same time the operating spring 41 causes the pawl pin 29 to advance the ratchet wheel 32 to the extent of one tooth, thereby causing the disk 73 and the chart 90 to be rotated one-sixtieth of a revolution. Thus the parts are in the next position and upon receipt of the next succeeding impulse the program circuit will be closed or not, depending upon whether that portion of the chart thus brought into cooperating position with the feeler is perforated.

In Figs. 8 to 10 are shown a modified construction, by means of which a single lobe cam revolving at one revolution every 12 hours may be used with a chart such as that shown in Fig. 5 which carries two fields which are adapted to be sensed alternately during alternate 12 hour periods. The use of such a cam permits a reduction in the size of the cam driving gears 82 and 87.

In the modification, the lower portion of the body member is designated by the reference numeral 110', and the single lobe cam by the reference numeral 88'. The remainder of the sliding switch assembly is identical to that previously described. A rotatable disk 135 is mounted by means of a pivot pin 136 at the lower portion of the body member 110'. The disk is provided with four slabbed pins 137, 138, 139 and 140, which correspond in function to the pin 113 described in connection with Figs. 1 to 7. Pins 138 and 140 are located closer to the pivot pin 136 than pins 137 and 139, so that when the slabbed pins 137 and 139 ride on the cam 88' the body member 110' of the sliding switch assembly will be supported in a higher position for any given angular position of the cam 88' than when the slabbed pins 138 and 140 ride on the cam 88'. The a. m. pins 138 and 140 are oppositely and equidistantly disposed with respect to the pivot pin 136, as are the p. m. pins 137 and 139.

Means are provided to maintain the disk 135 in any one of four positions, in each of which one of the pins 137 to 140, inclusive, is maintained directly below the pivot pin 136, as shown in Fig. 8, this means comprising a pivotally mounted detent 141 which cooperates with one of a series of four notches 142 formed in the periphery of the disk 135. A leaf spring 143 urges the detent against the edge of the disk 135.

The drop face of the cam 88' is undercut, as indicated by the reference numeral 144, forming a projection 145. This construction permits clearance by the series of pins 137 to 140, one of which will always be to the left of the projection 145, during the drop off.

In Fig. 8, the parts are shown in their 12 o'clock p. m. position. As the cam 88' moves slightly to the left on receipt of the next impulse, the sliding switch assembly will drop, the projection 145 being disengaged from pin 137. Pin 138 will then engage the projection 145 and the impact will cause the disk 135 to be rotated through 90° until the pin 138 is brought into the uppermost position, this rotation initially taking place against the bias of the spring 143. It will be noted that a portion of the surface of each slabbed pin has been flattened as shown at 146, this flattened portion serving as a cam surface which cooperates with the projection 145 so as to cause the pin 138 to be rotated slightly beyond its uppermost position so as to clear the projection 145. In this position of the parts, as shown in Fig. 9, the detent 141 has been partially displaced against the bias of spring 143.

After the pin 138 has dropped below the projection 145, the action of the detent 141 will cause the disk to be rotated back to its normal position before the pin 140 contacts the cam 88' at its lowest portion.

In this modification, it will be seen that each time the switch assembly drops off of the cam 88', the elevation of the switch assembly with respect to the cam will be shifted so that during successive cycles of operation the sensing device will alternately sense the a. m. and p. m. fields of the chart.

Of course, if preferred, this modification may be used with a two lobed cam which rotates once in 24 hours, the lobes in this instance being of the same configuration as contrasted with the offset lobes 124 and 125 disclosed in Figs. 1 to 7. However, by using a cam 88' having a single lobe and which rotates once every 12 hours, smaller gears can be used and increased accuracy can be attained.

The motive power for the program instrument herein described is received from a master clock or synchronous motor controlled timing contact once each minute to energize magnets 16 and 17; but it is apparent that the program device can also be made to operate by means of clockwork of the usual spring actuated type, or by direct mechanical connection to a synchronous electric motor through means of a cam and lever cooperating with armature levers 23 and 24, or by a combination of impulse producing means and direct mechanical means.

Although I have shown only the preferred embodiments of my invention, it will be understood that various modifications and changes may be made therein without departing from the spirit of my invention. The above description is intended to be illustrative only, and my invention is to be limited only by the appended claims.

I claim:

1. A program instrument comprising a perforated chart, a feeler cooperating with the surface of said perforated chart, time responsive driving means for rotating said chart past said feeler, means operated by said time responsive driving means to cause simultaneous movement of said chart and said feeler towards each other, and circuit closing means actuated by the relative motion between said chart and said feeler which results when said feeler is in registry with a perforation on said chart.

2. A program instrument comprising a rotatable chart provided with perforations in predetermined angular positions, a feeler disposed adjacent to said chart, secondary mechanism adapted to be advanced upon the receipt of an impulse for rotating said chart past said feeler, means operated by said secondary mechanism to cause axial displacement of said chart, and means associated with said feeler and bearing against said chart to cause operation of said feeler when said chart is axially displaced, and circuit closing means actuated by the axial displacement of said chart which results when a perforation of said chart is in registry with said feeler.

3. A program instrument comprising secondary mechanism adapted to be periodically actuated by the receipt of a series of electric impulses, a perforated chart adapted to be intermittently rotated by the operation of secondary mechanism, a feeler cooperating with the surface of said perforated chart, means operated by said secondary mechanism to cause simultaneous displacement of said feeler and said chart toward each other, and circuit closing means actuated by the displacement of said feeler as it drops into a perforation on said chart.

4. A program instrument comprising secondary mechanism adapted to be advanced upon the receipt of an impulse, a perforated chart adapted to be rotated by the operation of secondary mechanism, a feeler cooperating with the surface of said perforated chart, means operated by said secondary mechanism to cause axial displacement of said chart, means associated with said feeler and bearing against said chart to cause operation of said feeler when said chart is axially displaced, and circuit closing means actuated by the displacement of said feeler as it drops into a perforation on said chart.

5. Time indicating mechanism including a member adapted to be displaced into a predetermined position at a predetermined time comprising a rotatable disk, time responsive driving means therefor, a feeler cooperating with said disk, means actuated by said time responsive driving means for simultaneously moving said feeler and said disk toward each other, and means to limit the extent of the relative motion between said feeler and disk except at predetermined times, said means being controlled by the angular position of said disk, and said displaceable member being controlled by the extent of said relative motion in such a manner that it will be displaced into said predetermined position only at such times as said relative motion between said feeler and said disk is not limited by said motion limiting means.

6. Time indicating mechanism including a member adapted to be displaced into a predetermined position at a predetermined time, comprising a rotatable disk, time responsive driving means for said disk, means actuated by said time responsive driving means for periodically displacing said disk in an axial direction, and blocking means to limit the extent of the displacement of said disk except at predetermined times, said displaceable member being associated with said disk so that it will be displaced into said predetermined position only at such times as the axial displacement of said disk is not blocked.

7. Time indicating mechanism including a member adapted to be displaced into a predetermined position at a predetermined time comprising a time driven rotatable perforated chart, a feeler cooperating with said chart, and means for periodically displacing said chart toward said feeler in an axial direction, said feeler being pivotally mounted and having a portion engaging said chart in such a manner as to cause displacement of said feeler toward said chart when said chart is axially displaced, said chart serving to limit the relative motion between the parts except at such time when such feeler is opposite one of the perforations in said chart, and said displaceable member being associated with the parts in such a manner that it will be displaced into said predetermined position only at such times as are predetermined by the position of said perforations in said chart.

8. A program instrument comprising a rotatable punched chart, secondary mechanism for advancing said chart, a sliding switch assembly including feeler mechanism cooperating with said chart and a switch actuated by said feeler, and cam means driven by said secondary mechanism for determining the position of said sliding switch assembly with respect to said chart.

9. A program instrument comprising a removable punched chart, time responsive driving means for rotating said chart, a sliding switch assembly including feeler mechanism cooperating with said chart and a switch actuated by said feeler mechanism, and a swinging frame on which said switch assembly is slidably mounted whereby said switch assembly and frame may be swung to one side to permit removal of said chart.

10. A program instrument comprising a removable punched chart, secondary mechanism for rotating said chart, a sliding switch assembly including feeler mechanism cooperating with said chart and a switch operated by said feeler mechanism, a swinging frame on which said switch assembly is slidably mounted whereby said switch assembly and frame may be swung to one side to permit removal of said chart, and means actuated by said secondary mechanism and positioned beneath said swinging frame and engaging said sliding switch assembly for determining the extent of the radial displacement of said feeler from the center of said chart.

11. A program instrument comprising a removable punched chart, secondary mechanism for rotating said chart, a vertically sliding feeler cooperating with said chart, a swinging frame on which said feeler is slidably mounted whereby said feeler and frame may be swung to one side to permit removal of said chart, circuit closing means actuated by said feeler, and a cam driven by said secondary mechanism for determining the vertical position of said feeler assembly with respect to said chart.

12. A program instrument comprising a disk, a feeler for cooperation with the surface thereof, means to cause said feeler to follow a spiral path with respect to the surface of said disk, means for intermittently displacing said feeler towards the surface of said disk, a switch associated with said feeler, and means on the surface of said disk for determining the extent of the displacement of said feeler whereby the operation of said switch may be controlled.

13. A program instrument comprising secondary mechanism, a rotatable chart driven thereby provided with a plurality of perforations in predetermined positions, a rotatable cam driven by said secondary mechanism, feeler means for cooperation with the surface of said chart, said feeler means being adapted to be displaced by said cam in a radial direction along the surface of said chart as said chart is rotated, and circuit closing means actuated by said feeler means as it drops into said perforations.

14. A program instrument comprising secondary mechanism, a rotatable chart provided with perforations driven thereby, a rotatable cam driven by said secondary mechanism, feeler means for cooperation with the surface of said chart, said feeler means being adapted to be displaced by said cam in a radial direction parallel to the surface of said chart as said chart is rotated so as to trace a spiral path with respect to the surface of said chart, means for periodically operating said feeler means, and circuit closing means associated with said feeler means, the operation of said circuit closing means being controlled by the position of said feeler with respect to the perforations in said chart at the times during which said feeler means is operated.

15. In a program instrument having secondary mechanism, a rotatable perforated chart driven thereby, and periodically operating feeler means constructed for displacement towards the surface of said chart, a cam having a plurality of lobes which successively engage said feeler means to determine the radial position thereof with respect to the surface of said perforated chart, said lobes being of different shapes whereby said feeler will be caused to scan said chart in different spiral paths during successive periods of operation.

16. In a program instrument of the class described having secondary mechanism, a rotatable perforated chart driven thereby, and a feeler for cooperation with the surface of said chart, a cam having two co-planar lobes, the cam surface of one lobe being radially offset from the cam surface of the other, and engaging said feeler for causing rectilinear motion thereof whereby said feeler will be caused to trace a predetermined spiral path with respect to the surface of said chart when engaged by one of said lobes, and will be caused to trace a similar spiral path which is radially offset from said first mentioned spiral path when engaged by the other of said lobes.

17. In a secondary mechanism, an electromagnet, an armature for cooperation therewith, pawl and ratchet means operated by said armature, a rotatable time indicating member driven by said pawl and ratchet means, said time indicating means being axially displaceable, and means actuated by the movement of said armature for axially displacing said time indicating member whereby both rotation and axial displacement are periodically imparted to said time indicating member.

18. In a secondary mechanism, an electromagnet, an armature for cooperation therewith, pawl and ratchet means operated by said armature, a rotatable member driven by said pawl and ratchet means, said rotatable member being axially displaceable, and means actuated by the movement of said armature into attracted position for axially displacing said rotatable member and for maintaining it in such displaced position until such time as said electromagnet is de-energized, said pawl and ratchet means operating to advance said time indicating means upon de-energization of said electromagnet, and circuit control means operated by the axial displacement of said time indicating means when the latter has been rotated into certain predetermined angular positions.

19. In a time indicating mechanism, a shaft, a flange on said shaft, a pivoted member bearing against said flange, time responsive means for periodically rocking said pivoted member to displace said shaft in an axial direction, said shaft being driven by said time responsive means, and time indicating means, including a member slidably keyed to said shaft, adapted to be displaced only when said shaft is in a predetermined angular position.

20. In a secondary mechanism, an axially displaceable shaft, an electromagnet and armature means cooperating therewith, means connecting said armature with said displaceable shaft for causing displacement of said shaft during operation of said armature, pawl and ratchet means associated with said armature for driving said shaft, a member rotating with said shaft and mounted thereon in axially shiftable relationship, means controlled by the angular position of said member for determining the axial position thereof with respect to said shaft, and time indicating means actuated by the axial displacement of said member with said shaft.

21. In a secondary mechanism, an hour shaft, a flanged sleeve fixed to said hour shaft, a pivoted yoke member engaging said flanged sleeve for displacing said hour shaft in an axial direction, an electromagnet, armature means cooperating therewith, and means connecting said armature with said yoke member for rocking the same and for causing displacement of said hour shaft, and pawl and ratchet means associated with said armature for driving said hour shaft, whereby unidirectional rotation and reciprocating motion in an axial direction may be imparted to said hour shaft by a single source of power.

22. In a program instrument of the class described, having an hour shaft and a disk rotating therewith, means for intermittently displacing said hour shaft in an axial direction, and a lost motion connection between said disk and said hour shaft, including resilient means for urging said disk to a predetermined axial position with respect to said hour shaft whereby the axial displacement of said disk may be blocked without impeding the axial displacement of said hour shaft.

23. In a program instrument having a punched chart, an hour shaft on which said chart is carried in axially shiftable relationship, means for displacing said hour shaft in an axial direction, and a spring for urging said chart to a predetermined axial position with respect to said hour shaft whereby the axial displacement of said chart may be limited without affecting the axial displacement of said hour shaft.

24. In a time signalling device comprising a circular chart, intermittent time actuated chart turning means, signal actuating means, the operation of said means being determined by selectable and permanently recorded positions on said circular chart, and chart sensing means to sense said chart intermittently in a spiral path to control the operation of said signal actuating means.

25. In a time signalling instrument, intermittent time responsive chart turning means, intermittent time responsive chart sensing means, circuit closing means, and a chart having positions thereon which are made selectively operable, said positions occupying locations disposed on the chart that are proximate to a spiral path scribed by said sensing means, and that lie along intersecting radial lines, said lines denoting time divisions that correspond to the interval of intermittence of said intermittent turning and sensing means.

26. A control device to control the operation of a program instrument comprising a circular chart having a spiral field, a spiral line marked on said chart to denote the location of said field, and a plurality of radial lines intersecting said spiral line to denote the location of selectable positions lying in said spiral field, any of which positions may be made operable by perforating the chart at the point of intersection.

27. A control element for a time signalling device having two spiral fields disposed in interleaving relationship, and a spiral line marked on said element which designates the outer boundary of one of said fields and the inner boundary of the other of said fields.

28. A time signalling device having successive cycles of operation comprising a rotatable chart having two spiral fields disposed in interleaving relationship, sensing means for cooperation with said chart, and means for determining the radial position of said sensing means with respect to said chart so that said two spiral fields will be sensed alternately during alternate cycles of operation.

29. A time signalling device having successive cycles of operation comprising a rotatable chart having two spiral fields disposed in interleaving relationship, sensing means for cooperation with said chart, and means for determining the radial position of said sensing means with respect to said chart so that said two spiral fields will be sensed alternately during alternate cycles of operation, said means comprising a cam engaging said sensing means and having two lobes which are radially offset one from the other.

30. A time signalling device having successive cycles of operation comprising a rotatable chart having two spiral fields disposed in interleaving relationship, sensing means for cooperation with said chart, and means for determining the radial position of said sensing means with respect to said chart so that said two spiral fields will be sensed alternately during alternate cycles of operation, said means comprising a cam and a cam follower shiftably associated with said sensing means so that it will assume a plurality of positions with respect to said sensing means.

31. In a time signalling device of the type described herein, a bodily displaceable sensing device having a rotatable element provided with a plurality of cam contacting portions, a cam cooperating with one or the other of said cam contacting portions, the relationship of said cam and said rotatable member being such that during successive cycles of operation of said cam said rotatable member will be advanced so as to bring a different cam contacting portion into registry with said cam, and means to maintain a fixed angular relationship of said rotatable member with said sensing means throughout one cycle of operation of said cam, said cam contacting portions having dissimilar spacing with respect to the axis of said rotatable member, whereby the displacement of said sensing device, for corresponding angular dispositions of said cam, during a given cycle will differ in extent from its displacement during a preceding cycle.

32. In a time signalling device operating in successive cycles and having a rotatable chart provided with two spiral fields disposed in interleaving relationship together with vertically sliding means for alternately sensing said two fields during alternate cycles of operation, a rotatable cam disposed beneath said sensing means for determining the vertical position thereof, said cam having a drop face, and a cam follower carried by said sensing means, said cam follower comprising a rotatable disk, a pivot therefor by means of which said disk may be rotatably mounted on said sensing means, two sets of pins projecting from said disk in a manner so that the pin in the lowermost position will ride on said cam, the pins of one set being spaced from said pivot at a distance different from the corresponding spacing of the pins of the other set, and the pins of the two sets being alternately disposed, the parts being constructed so that as that pin in the lowermost position drops off said cam at said drop face, the engagement of another pin by said cam will cause said disk to be rotated into a position wherein a pin of the other set will then be in the lowermost position so that during a succeeding cycle of operation said sensing means will sense a different field of said chart.

RICHARD L. LORENZ.